(12) United States Patent
Otsuki et al.

(10) Patent No.: US 9,733,552 B2
(45) Date of Patent: Aug. 15, 2017

(54) IMAGE PICKUP DEVICE AND PROJECTOR (75) Inventors: Nobuyuki Otsuki, Matsumoto (JP); Haiyan Zhou, Azimino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 185 days.

(21) Appl. No.: 13/568,660

(22) Filed: Aug. 7, 2012

(65) Prior Publication Data
US 2013/0038524 A1  Feb. 14, 2013

(30) Foreign Application Priority Data

Aug. 9, 2011 (JP) ................................. 2011-173619

(51) Int. Cl.
| | |
|---|---|
| *G09G 5/00* | (2006.01) |
| *H04N 5/33* | (2006.01) |
| *G03B 17/14* | (2006.01) |
| *G06F 3/042* | (2006.01) |
| *H04N 9/31* | (2006.01) |
| *G06F 3/0354* | (2013.01) |
| *H04N 5/225* | (2006.01) |
| *G03B 17/54* | (2006.01) |
| *G03B 21/28* | (2006.01) |

(52) U.S. Cl.
CPC ............. *G03B 17/14* (2013.01); *G03B 17/54* (2013.01); *G03B 21/28* (2013.01); *G06F 3/03542* (2013.01); *G06F 3/0425* (2013.01); *H04N 5/2254* (2013.01); *H04N 5/332* (2013.01); *H04N 9/3194* (2013.01)

(58) Field of Classification Search
CPC ......................... H04M 1/0272; H04M 9/3161
See application file for complete search history.

(56) References Cited

U.S. PATENT DOCUMENTS

| | | | | |
|---|---|---|---|---|
| 3,208,339 A | * | 9/1965 | Tiffenberg | ............. G03B 33/00 353/84 |
| 3,685,900 A | * | 8/1972 | Kirby | ..................... G03B 27/73 355/32 |
| 5,371,543 A | * | 12/1994 | Anderson | ............ G02B 26/008 348/270 |

(Continued)

FOREIGN PATENT DOCUMENTS

| | | |
|---|---|---|
| CN | 101750696 A | 6/2010 |
| CN | 101873425 A | 10/2010 |

(Continued)

OTHER PUBLICATIONS

U.S. Appl. No. 12/831,801, filed Jul. 7, 2010 in the name of Hiroyuki Tanaka.

*Primary Examiner* — Jennifer Mehmood
*Assistant Examiner* — Carl Adams
(74) *Attorney, Agent, or Firm* — Oliff PLC (57) ABSTRACT

An image pickup device includes an image pickup element which captures an image of a projection surface, an optical filter which has higher transmissivity for infrared light than for visible light, a visible light transmitting member whose transmissivity for visible light is higher than the corresponding transmissivity of the optical filter, and a switching unit which switches between a first condition where the optical filter is disposed on an optical path of light entering the image pickup element, and a second condition where the visible light transmitting member is disposed on the optical path.

2 Claims, 9 Drawing Sheets (56) References Cited

U.S. PATENT DOCUMENTS

| | | |
|---|---|---|
| 5,712,658 A | 1/1998 | Arita et al. |
| 5,835,078 A | 11/1998 | Arita et al. |
| 6,188,388 B1 | 2/2001 | Arita et al. |
| 6,226,460 B1 | 5/2001 | Hino et al. |
| 6,802,611 B2 | 10/2004 | Chu et al. |
| 6,924,816 B2 | 8/2005 | Deering |
| 7,176,881 B2 | 2/2007 | Nishimura et al. |
| 7,270,422 B2 | 9/2007 | Matsuda et al. |
| 7,306,341 B2 | 12/2007 | Chang |
| 7,559,656 B2 | 7/2009 | Yumiki et al. |
| 7,762,672 B2 | 7/2010 | Yokoyama et al. |
| 2001/0022861 A1* | 9/2001 | Hiramatsu ............ G06F 3/0425 382/291 |
| 2003/0178555 A1 | 9/2003 | Fang |
| 2004/0246448 A1* | 12/2004 | Ogawa ................... H04N 9/315 353/84 |
| 2005/0270494 A1 | 12/2005 | Banning |
| 2007/0065135 A1* | 3/2007 | Takei .................... G03B 7/003 396/241 |
| 2007/0086098 A1* | 4/2007 | Sekiguchi ............ G02B 26/008 359/892 |
| 2010/0134878 A1 | 6/2010 | Wu |
| 2011/0007283 A1 | 1/2011 | Tanaka |
| 2011/0012925 A1 | 1/2011 | Luo |

FOREIGN PATENT DOCUMENTS

| | | |
|---|---|---|
| CN | 201689254 U | 12/2010 |
| CN | 101963740 A | 2/2011 |
| JP | H07-261913 | 10/1995 |
| JP | 2001-236178 A | 8/2001 |
| JP | A-2003-276399 | 9/2003 |
| JP | A-2003-348385 | 12/2003 |
| JP | 2004-053836 A | 2/2004 |
| JP | A-2004-128830 | 4/2004 |
| JP | 2005-062200 A | 3/2005 |
| JP | A-2005-92592 | 4/2005 |
| JP | A-2005-094599 | 4/2005 |
| JP | A-2005-148451 | 6/2005 |
| JP | A-2005-286575 | 10/2005 |
| JP | A-2006-53313 | 2/2006 |
| JP | 2006-345228 A | 12/2006 |
| JP | A-2008-109337 | 5/2008 |
| JP | A-2011-2650 | 1/2011 |
| JP | 2011-097264 A | 5/2011 |

* cited by examiner

IMAGE PICKUP DEVICE AND PROJECTOR

BACKGROUND

1. Technical Field

The present invention relates to an image pickup device and a projector.

2. Related Art

A projector known in the art modulates light emitted from a light source according to image information, and projects the modulated light with magnification onto a projection surface such as a screen. Recently, such a technology has been proposed which overlaps figures, characters or the like on an image projected from the projector for display (for example, see JP-A-2011-2650).

A projector disclosed in JP-A-2011-2650 includes an image pickup device, and constitutes a display system functioning as an interactive white board system when used in combination with a pointing device capable of emitting infrared light from its tip, and a PC (personal computer) functioning both as an image output device and an image analyzer. The image pickup device has a camera disposed inside an opening formed in an outside casing of the image pickup device, which opening is closed by a cover capable of transmitting infrared light. The camera of the image pickup device detects infrared light emitted from the pointing device when the pointing device is operated on a projection surface. Based on the detection of the infrared light, the projector overlaps figures or the like corresponding to the track of the movement of the pointing device on the original image, and projects the resultant image.

Though not explained in detail in JP-A-2011-2650, it is assumed that the cover of the projector through which infrared light is transmitted is made of material capable of cutting wavelengths of lights such as visible light other than infrared light so as to prevent the camera from receiving light other than the infrared light emitted from the pointing device and recognising the received light as the infrared light.

According to the projector disclosed in JP-A-2011-2650, the infrared light emitted from the pointing device can be detected by the camera and overlapped on the original image for projection of an overlapping image, in this case, however, an image corresponding to visible light other than the infrared light is difficult to be captured by the camera. Thus, according to the projector disclosed in JP-A-2011-2650, an image projected on the projection surface is difficult to be captured by the camera, wherefore the original image is difficult to be processed by using the image projected on the projection surface. For example, when control patterns associated with calibration of the position of the pointing device on the projection surface, and distortion of the projected image are not allowed to be obtained by the camera, calibration and image distortion correction are difficult to be automatically performed. In this case, manipulation of the projector becomes complicated.

SUMMARY

An advantage of some aspects of the invention is to provide a technology capable of solving at least a part of the aforementioned problems, and the invention can be implemented as the following modes or application examples.

Application Example 1

This application example is directed to an image pickup device which includes: an image pickup element which captures an image of a subject; an optical filter which has higher transmissivity in an infrared range than in a visible light range; a visible light transmitting member which has higher transmissivity in the visible light range than the transmissivity of the optical filter in the visible light range; and a switching unit which switches between a first condition where the optical filter is disposed on an optical path of light entering the image pickup element, and a second condition where the visible light transmitting member is disposed on the optical path.

The image pickup device according to this application example has the optical filter and the visible light transmitting member, and is designed to switch between the first condition in which the switching unit positions the optical filter on the optical path of light entering the image pickup element, and the second condition in which the switching unit positions the visible light transmitting member on this optical path. According to this structure, the image pickup element receives infrared light transmitted through the optical, filter and captures an image of the infrared light in the first condition, and receives visible light transmitted through the visible light transmitting member and captures an image of the visible light in the second condition.

Moreover, the structure which sets the optical filter on the optical path of the light entering the image pickup element in the first condition, and sets the visible light transmitting member on this optical path in the second condition can reduce the difference between the first condition and the second condition in a refraction condition of the light reaching the image pickup element, thereby allowing the image pickup element to capture an image while reducing the difference in a focal point between the first condition and the second condition.

Accordingly, the image pickup device in this application example can securely capture both an image of infrared light and an image of visible light.

Application Example 2

It is preferable that the image pickup device according to the above application example further includes an image pickup lens which forms an image of light received from the subject on the image pickup element, and that the optical filter is inserted between the image pickup element and the image pickup lens in the first condition, and the visible light transmitting member is inserted between the image pickup element and the image pickup lens in the second condition.

According to this application example, the optical filter and the visible light transmitting member disposed between the image pickup element and the image pickup lens can receive light approaching the image pickup element to form an image thereon from the image pickup lens. According to this structure, the sizes of the optical filter and the visible light transmitting member, and the shifts of the optical filter and the visible light transmitting member for switching between the first condition and the second condition become smaller and shorter than the corresponding sizes and shifts in such a structure which positions the optical filter and the visible light transmitting member inside the image pickup lens or on the side opposite to the image pickup element with respect to the image pickup lens. Thus, the image pickup device can be miniaturized.

Moreover, the optical filter and the visible light transmitting member are disposed close to the image pickup element. In this case, the difference between the first condition and the second condition in the refraction condition of the light reaching the image pickup element can further efficiently decrease.

Accordingly, the image pickup device according to this application example can securely capture an image of infrared light and an image of visible light while reducing the size of the image pickup device.

Application Example 3

It is preferable that the switching unit of the image pickup device according to the above application examples includes a movable member which holds the optical filter and the visible light transmitting member and switches between the first condition and the second condition by rotation around a center shaft extending in a direction along an optical axis of the image pickup element, and a base member which supports the movable member in such a condition that the movable member can rotate.

According to this application example, the movable member which holds the optical filter and the visible light transmitting member is supported on the base member and rotated to switch between the first condition and the second condition. Moreover, the movable member rotates around the center shaft extending in the direction along the optical axis of the image pickup element. In other words, the optical filter and the visible light transmitting member shift in a plane crossing the optical axis of the image pickup element at right angles in accordance with the rotation of the movable member so as to come into and out of a space between the image pickup element and the image pickup lens. Thus, switchover between the first condition and the second condition can be easily achieved by the insertion and withdrawal of the optical filter and the visible light transmitting member to and from the space between the image pickup element and the image pickup lens.

Moreover, the optical filter and the visible light transmitting member shifting along with the rotation of the movable member can shift with higher accuracy than other examples such as an example which linearly shifts the optical filter and the visible light transmitting member. Thus, the structure of this application example can reduce the size and cost by efficiently sizing the optical filter and the visible light transmitting member, and can easily determine the first condition or the second condition by using a detection switch added to detect the position of the movable member.

Application Example 4

This application example of the invention is directed to a projector which includes: a projection unit which modulates light emitted from a light source according to image information and projects the modulated light; and the image pickup device according to any one of the above application examples which captures an image of a projection surface onto which light emitted from the projection unit is projected.

The projector according to this application example has the projection unit and the image pickup device described above. Thus, the projector can project an image based on a capture image of infrared light or visible light captured by the image pickup element.

For example, this application example may be practiced as in the following system including the projector of this application example and a pointing device, for example. In the second condition, the image pickup device captures an image of a control pattern projected by the projection unit (captures an image of visible light) to use the image for calibration of the position of the pointing device on the projection surface, automatic distortion correction of an image, and for other purposes. In the first condition, the image pickup device captures an image of infrared light emitted from the pointing device operated on the projection surface so that the projection unit can project an overlapping image on the projection surface, which image carries information of this infrared light on original image information. This structure easily achieves interactive input and output while reducing complicated manipulation by an operator, thereby widening the application range of the projector such as applications for lessons and meetings.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A projector according to a first embodiment is hereinafter described with reference to the drawings.

Figure 1:
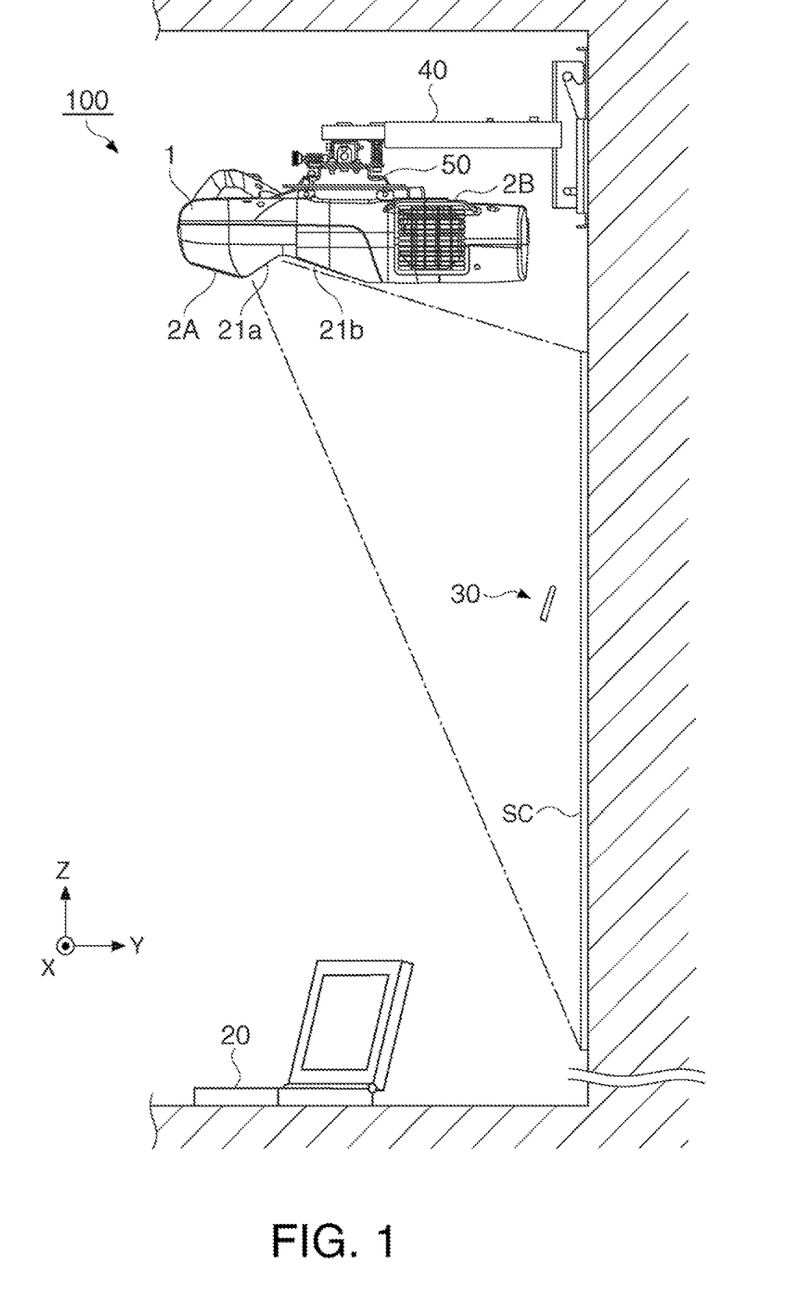
FIG. 1 schematically illustrates a structure of a display system including a projector according to a first embodiment.

FIG. 1 schematically illustrates the general structure of a display system 100 including a projector 1 in this embodiment.

The display system 100 includes the projector 1 in this embodiment, a PC (personal computer) 20 connected with the projector 1 via a not-shown cable to function as an image output device, and a pointing device 30.

As illustrated in FIG. 1, the projector 1, as an apparatus supported by a support unit 40 provided on a wall surface above a projection surface SC such as a screen, projects light obliquely downward from the side facing to below so as to form an image corresponding to image information transmitted from the PC 20 on the projection surface SC. The projector 1 contains an image pickup device 4 (see FIG. 3) to capture an image of the projection surface SC corresponding to a subject. The details of this structure will be described later.

When the tip of the pointing device 30 is pressed against the projection surface SC, the pointing device 30 emits infrared light from the tip.

The PC 20 has both the functions of transmitting image information to the projector 1, and controlling the projector 1 based on the image captured by the image pickup device 4.

The display system 100 is designed to make adjustments based on the image captured by the image pickup device 4, and project an overlapping image onto the projection surface SC, on which image the track of the movement of the pointing device 30 is overlapped.

Main Structure of Projector.

Figure 2:
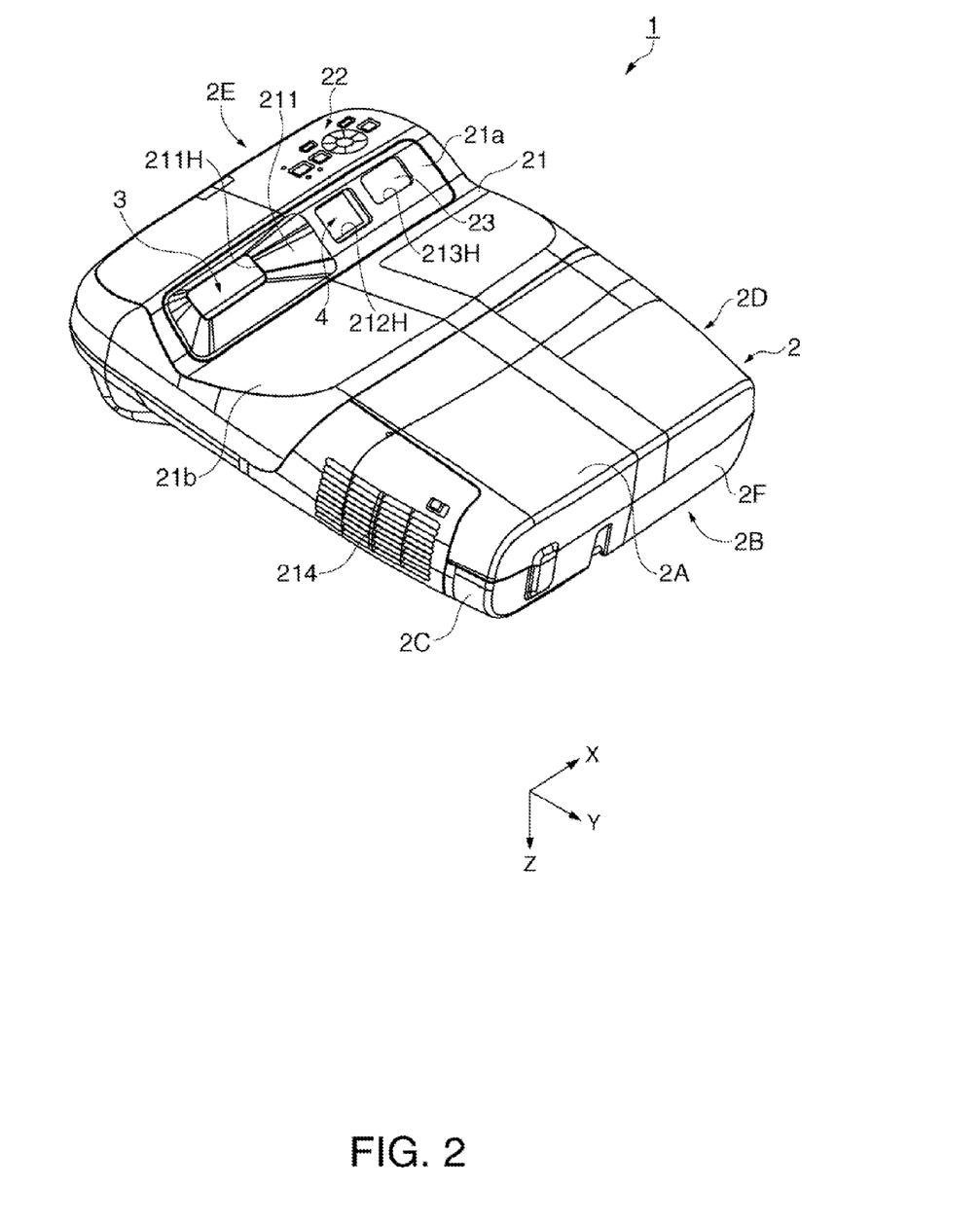
FIG. 2 is a perspective view illustrating the external appearance of the projector according to the first embodiment.
Figure 3:
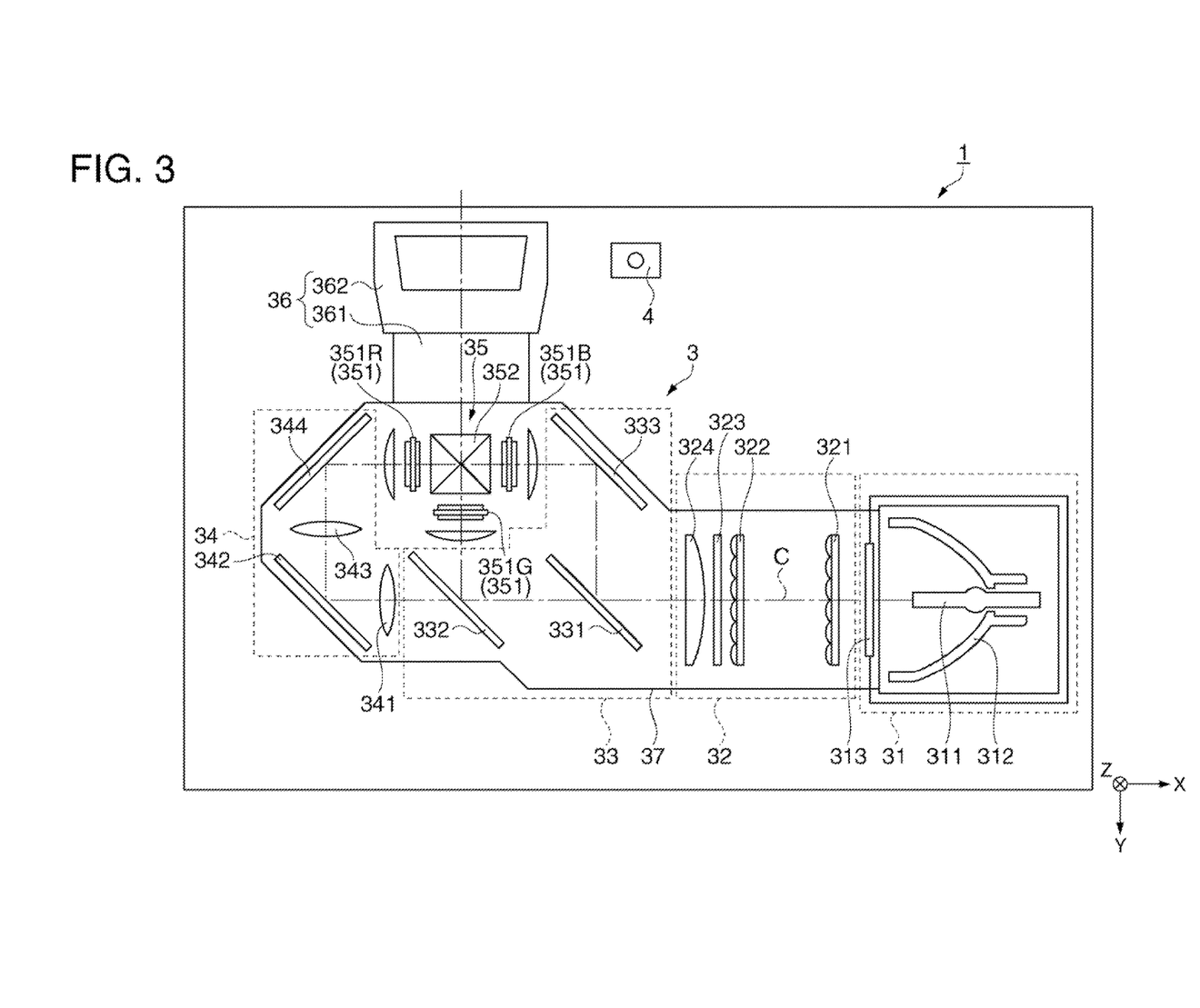
FIG. 3 schematically illustrates the general structure of the projector according to the first embodiment.

FIG. 2 is a perspective view illustrating the external appearance of the projector 1 according to this embodiment, showing the projector 1 in FIG. 1 as viewed from below (light projection side). FIG. 3 schematically illustrates the general structure of the projector 1 in this embodiment.

As illustrated in FIGS. 2 and 3, the projector 1 includes an external housing 2 constituting an outside case, a controller (not shown), an optical unit 3 corresponding to a projection unit, and the image pickup device 4.

Though not shown in the figures, the projector 1 further includes a light source device 31 equipped on the optical unit 3, a power source device which supplies power to the controller, a cooling unit which cools the optical unit 3, and other components within the external housing 2. In the following description, the direction toward the projection surface SC corresponds to the front direction (+Y direction) with the direction normal to the projection surface SC defined as the front-rear direction, the direction opposite to the direction of gravity corresponds to the upward direction (+Z direction), and the direction to the right as viewed from the front of the projection surface SC corresponds to the rightward direction (+X direction), under the condition in which the projector 1 is supported by the support unit 40, for convenience of explanation.

As illustrated in FIG. 2, the external housing 2 as an assembly of a plurality of components made of synthetic resin has a projection side surface 2A forming a −Z side surface, a jig attachment surface 2B forming a +Z side surface, a left side surface 2C and a right side surface 2D forming left and right side surfaces, respectively, and a front surface 2F and a rear surface 2E forming front and rear surfaces, respectively.

As illustrated in FIG. 2, a recess 21 is formed in a rear region (−Y side) of the projection side surface 2A with respect to the front-rear direction. The recess 21 has a first inclined surface 21a and a second inclined surface 21b. An operation panel 22 provided with a plurality of keys is equipped behind the recess 21.

The first inclined surface 21a is located on the side close to the rear surface 2E with respect to the second inclined surface 21b, and extends from the rear toward the front while inclined in such a direction as to approach the +Z side (toward the jig attachment surface 2B). The second inclined surface 21b connected with the first inclined surface 21a extends from the rear toward the front while inclined in such a direction as to approach the −Z side (away from the jig attachment surface 2B).

A concave 211 is provided in the first inclined surface 21a near the left side surface 2C. A first opening 211H is formed in the bottom of the concave 211.

The projection side surface 2A is so arranged as to face to below under the condition in which the projector 1 is supported by the support unit 40 (see FIG. 1). The projector 1 projects light through the first opening 211H onto the projection surface SC.

There are further provided substantially rectangular second opening 212H and third opening 213H in the concave 211 of the first inclined surface 21a in this order in the +X direction.

The image pickup device 4 (described later) is located inside the second, opening 212H, while a light receiving device (not shown) capable of receiving infrared signals from a remote controller (not shown) is disposed inside the third opening 213H. The third opening 213H is covered by a cover 23 which transmits infrared light and cuts off visible light.

An air intake port 214 having a plurality of slit-shaped holes is formed in a front region of the left side surface 2C. Not-shown air filter and air intake fan are provided inside the air intake port 214 so that cooling air for cooling the interior of the external housing 2 can be introduced through the air intake port 214 and the air filter by the driving of the air intake fan.

There is further provided a not-shown air discharge port in the right side surface 2D, and an air discharge fan disposed inside the air discharge port. Air introduced by the air intake fan cools the interior of the external housing 2, and then is discharged through the air discharge port.

As illustrated in FIG. 1, a metal fitting 50 is attached to the jig attachment surface 2B so that the projector 1 can be attached to the support unit 40 via the metal fitting 50.

The jig attachment surface 2B has a not-shown opening through which a cable (not shown) connected with a connection terminal is extended to the outside of the projector 1. The cable extended to the outside of the projector 1 is inserted into the support unit 40, and passes along the wall surface, and connects with an external device such as the PC 20.

The controller has a CPU (central processing unit), a ROM (read only memory), a RAM (random access memory), and others to function as a computer, and controls operation of the projector 1 such as operation associated with image projection.

Structure of Optical Unit

The optical unit 3 modulates light emitted from a light source 311 according to image information, and projects the modulated light under the control of the controller.

As illustrated in FIG. 3, the optical unit 3 includes the light source device 31, an integrator illumination system 32, a color separation system 33, a relay system 34, an electro-optic device 35, a projection device 36, and an optical component housing 37 which houses the respective components 31 through 36 at predetermined positions on an optical path.

As can be seen from FIG. 3, the optical unit 3 has a substantially L shape in the plan view, containing the light source device 31 detachably attached to one end of the L shape, and the projection device 36 disposed at the other end.

The light source device 31 has the discharge type light source 311 constituted by an extra-high pressure mercury lamp or a metal halide lamp, for example, a reflector 312, a collimating lens 313 functioning as a light transmitting member, and others. The light source device 31 reflects light emitted from the light source 311 using the reflector 312, equalizes the emission direction of the reflected light using the collimating lens 313, and supplies the collimated light toward the integrator illumination system 32.

The integrator illumination system 32 has a first lens array 321, a second lens array 322, a polarization converting element 323, and a stacking lens 324.

The first lens array 321, functioning as an optical element which divides the light emitted from the light source device 31 into a plurality of partial lights, has a plurality of small lenses arranged in matrix in a plane substantially perpendicular to an optical axis C of the light emitted from the light source device 31.

The second lens array 322 has a structure substantially similar to the structure of the first lens array 321, and stacks the partial lights received from the first lens array 321 on surfaces of liquid crystal light valves 351 (described, later) in cooperation with the stacking lens 324.

The polarization converting element 323 has the function of converting random, polarized lights received from the second lens array 322 into substantially one type of polarized lights processable by the liquid crystal light valves 351.

The color separation system 33 contains two dichroic mirrors 331 and 332, and a reflection mirror 333, and has the function of separating the light received from the integrator illumination system 32 into three color lights of red light (hereinafter referred to as "R light"), green light (hereinafter referred to as "G light"), and blue light (hereinafter referred to as "B light").

The relay system 34 contains an entrance side lens 341, a relay lens 343, and reflection mirrors 342 and 344, and has the function of guiding the R light separated by the color separation system 33 toward a liquid crystal light valve 351R for R light. The light guided by the relay system 34 of the optical unit 3 is not limited to the R light but may be other lights such as the B light.

The electro-optic device 35 contains the liquid crystal light valves 351 corresponding to light modulation devices, and a cross dichroic prism 352 corresponding to a color combining device, and has the functions of modulating the respective color lights separated by the color separation system 33 according to image information, and combining the modulated color lights.

A plurality of the liquid crystal light valves 351 are provided so that each of the three color lights can be processed by the corresponding liquid crystal light valve 351 (the liquid crystal light valve 351R for R light, a liquid crystal light valve 351G for G light, and a liquid crystal light valve 351B for B light). Each of the liquid crystal light valves 351 has a transmission type liquid crystal panel, and an entrance side polarization plate and an exit side polarization plate disposed on one and the other surfaces, respectively, of the liquid crystal panel.

Each of the liquid crystal light valves 351 has a rectangular pixel area which contains not-shown small pixels arranged in matrix. The light transmissivity of each pixel is determined in correspondence with a display image signal so that a display image can be formed within the pixel area. The respective color lights separated by the color separation system 33 are modulated by the liquid crystal light valves 351, and released toward the cross dichroic prism 352.

The cross dichroic prism 352 has a substantially square shape in the plan view produced by affixing four rectangular prisms to each other. Two dielectric multilayer films are provided on boundaries between the affixed rectangular prisms. The cross dichroic prism 352 reflects the color lights modulated by the liquid crystal light valves 351R and 351B using the dielectric multilayer films, and transmits the color light modulated by the liquid crystal light valve 351G so as to combine the respective color lights.

The projection device 36 has a lens unit 361 as a combination of plural lenses, and a reflection unit 362 containing an aspheric reflection mirror. The light combined by the cross dichroic prism 352 is enlarged by the lens unit 361, and made wide-angled by reflection on the reflection unit 362. The light reflected by the reflection unit 362 passes through the first opening 211H (see FIG. 2) of the external housing 2 to be projected onto the projection surface SC (see FIG. 1).

The projector 1 according to this embodiment which has the projection device 36 containing the lens unit 361 and the reflection unit 362 is a so-called short-focus projector which has a short projection distance.

As noted above, the image pickup device 4 is disposed inside the second opening 212H, and designed to capture an image projected on the projection surface SC, and an image of infrared light emitted from the pointing device 30 when the pointing device 30 is operated on the projection surface SC.

Structure of Image Pickup Device

The details of the image pickup device 4 are now explained.

Figure 4:
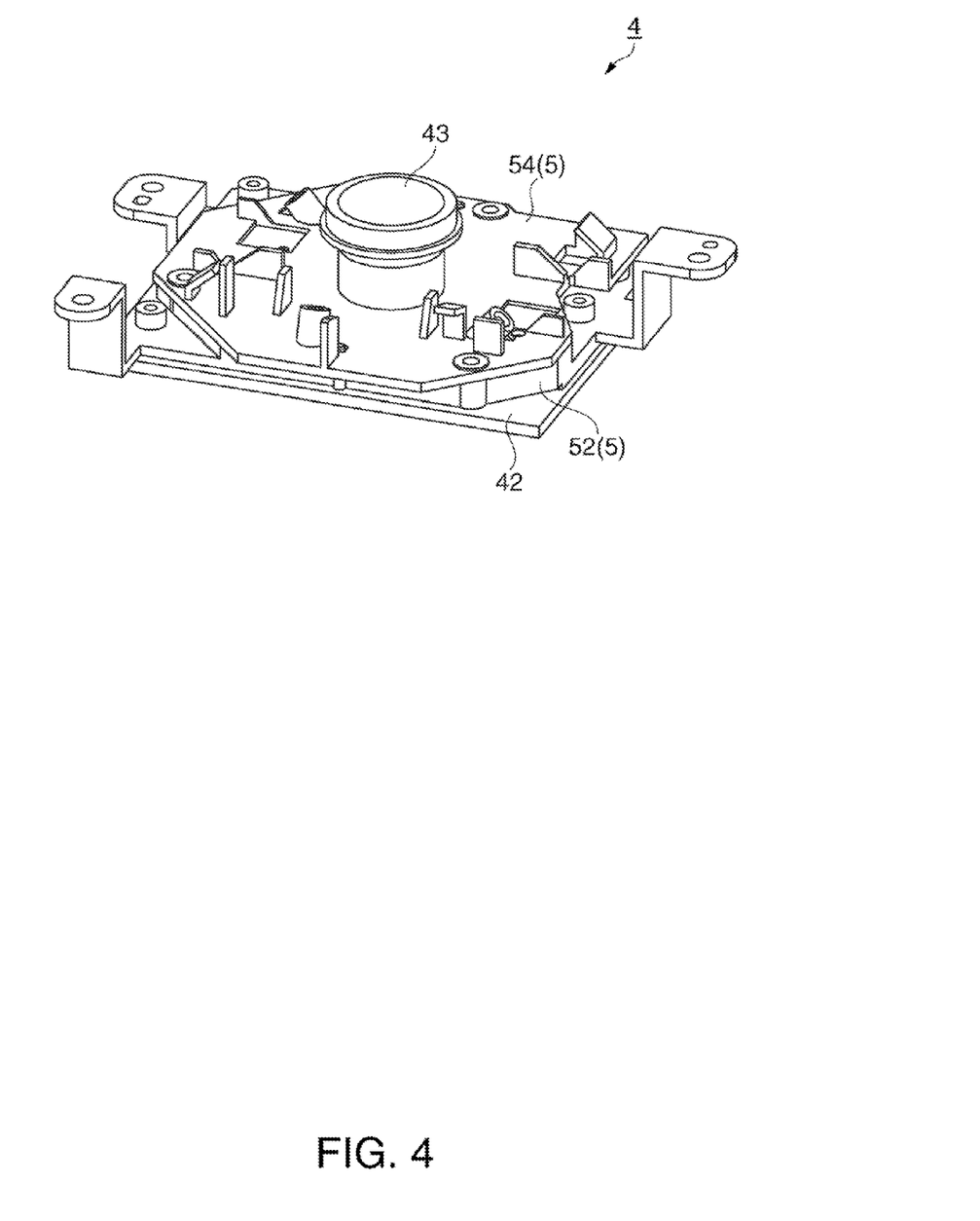
FIG. 4 is a perspective view of an image pickup device according to the first embodiment.
Figure 5:
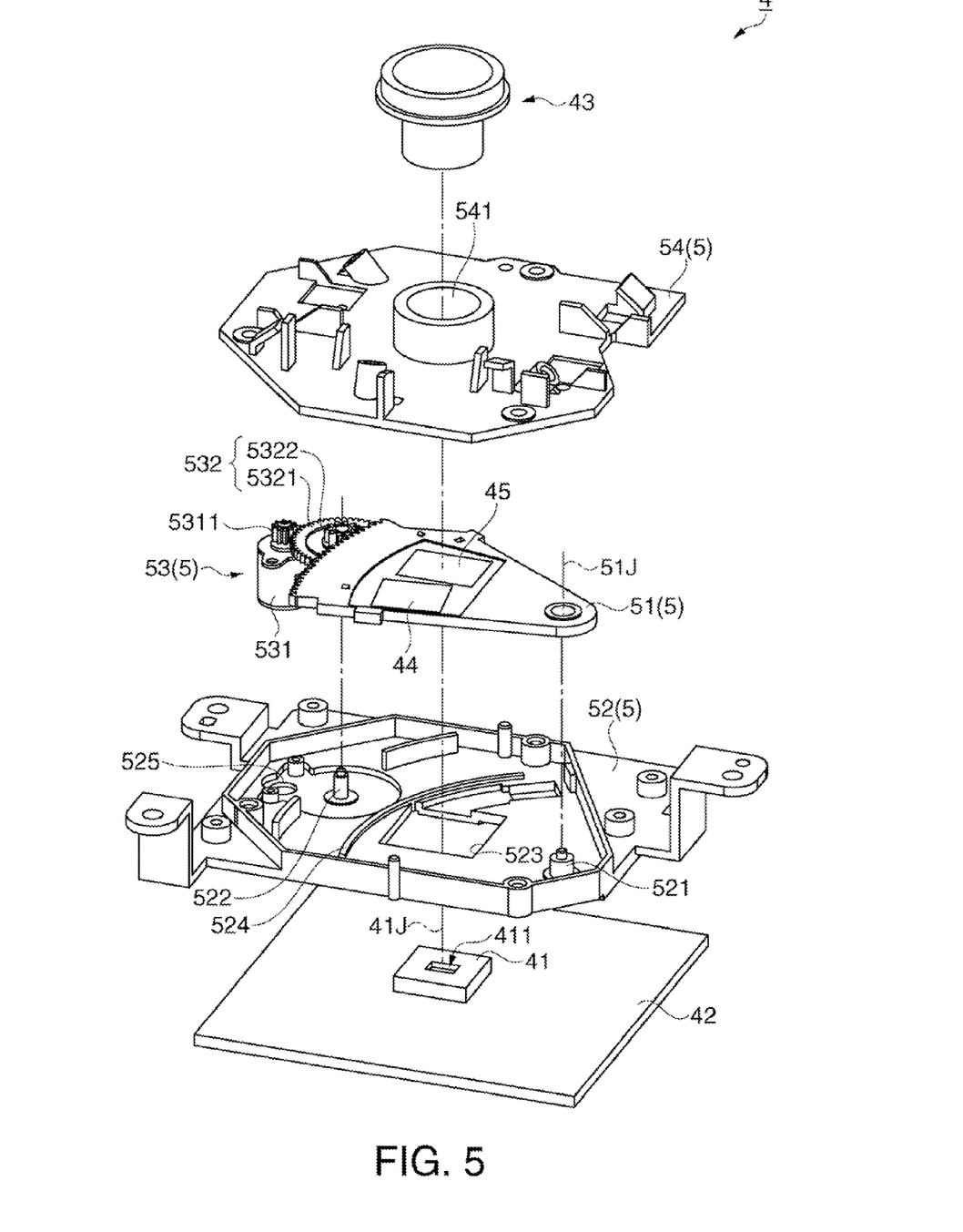
FIG. 5 is a perspective view of the image pickup device in a disassembled, condition according to the first embodiment.

FIG. 4 is a perspective view of the image pickup device 4. FIG. 5 is a perspective view of the image pickup device 4 in a disassembled condition.

As illustrated in FIGS. 4 and 5, the image pickup device 4 includes an image pickup element 41, a circuit board 42, an image pickup lens 43, an optical filter 44, a visible light transmitting member 45, and a switching unit 5.

The image pickup element 41 is constituted by a CCD (charge coupled device, a CMOS (complementary metal oxide semiconductor), or others.

The circuit board 42 is a unit on which the image pickup element 41 is mounted, and connects to the controller via a not-shown cable. The circuit board 42 is disposed along the first inclined surface 21a (see FIGS. 1 and 2), i.e., inclined to an X-Y plane, such that a light receiving portion ill of the image pickup element 41 faces to the projection surface SC for efficient capture of the image of the projection surface SC.

Though not shown in detail in the figures, the image pickup lens 43 contains a plurality of lenses, and receives an image projected on the projection surface SC and infrared light emitted from the pointing device 30 when the pointing device 30 is operated on the projection surface SC, and forms an image corresponding to the received image on the image pickup element 41. The image pickup lens 43 is a wide angle lens capable of capturing an image of the entire area of the projection surface SC.

The optical filter 44 is a so-called IR filter which has higher transmissivity in an infrared range than in a visible light range, that is, transmits infrared light and cuts off visible light. The optical filter 43 in this embodiment is constituted by a glass plate on which a thin film is formed by deposition or other methods.

The visible light transmitting member 45 is so designed as to have higher transmissivity in the visible light range than the transmissivity of the optical filter 44 in the visible light range. The visible light transmitting member 45 is constituted by a glass plate having the same thickness as that of the optical filter 44.

As illustrated in FIG. 5, the optical filter 44 and the visible light transmitting member 45 are rectangular components in the plan view, and disposed side by side on a movable member 51 of the switching unit 5 (described later). The optical filter 44 and the visible light transmitting member 45 may be made of synthetic resin or the like rather than glass.

The positions of the optical filter 44 and the visible light transmitting member 45 are switched between a first condition in which the optical filter 44 is positioned on the optical path of the light entering the image pickup element 41, and a second, condition in which the visible light transmitting member 45 is positioned on this optical path, in accordance with rotation of the movable member 51. More specifically, the positions of the optical filter 44 and the visible light transmitting member 45 are switched between the first condition and the second condition by insertion and withdrawal of these components 44 and 45 into and from a space between the image pickup element 41 and the image pickup lens 43 in accordance with rotation, of the movable member 51.

As illustrated in FIG. 5, the switching unit 5 includes the movable member 51, a base member 52, a driving unit 53, and a pressing member 54, and so designed as to switch between the first condition and the second condition.

Figure 6A:
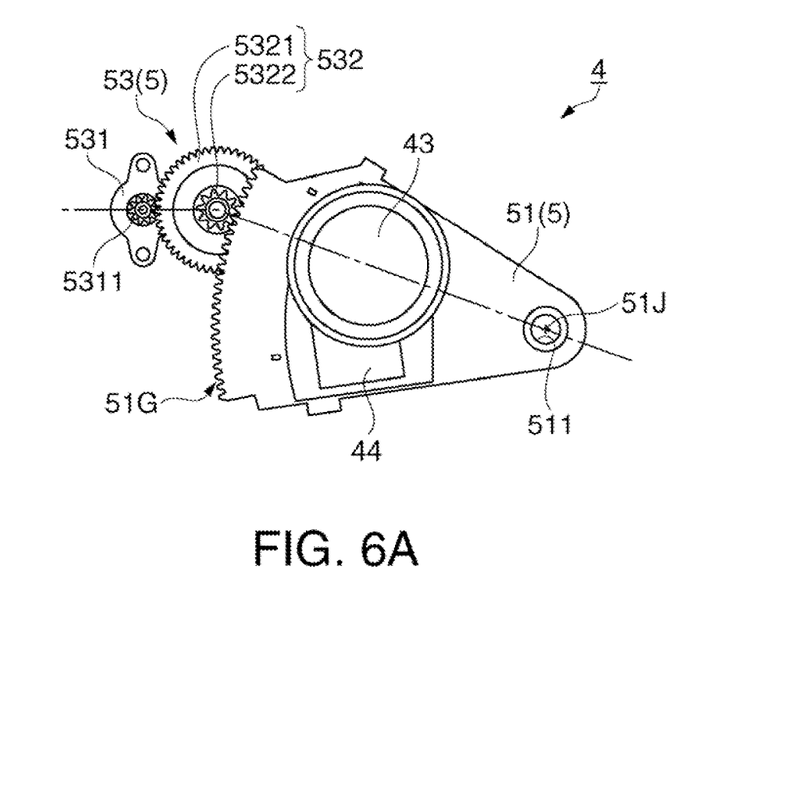
FIGS. 6A and 6B illustrate the image pickup device in a second condition according to the first embodiment.
Figure 6B:
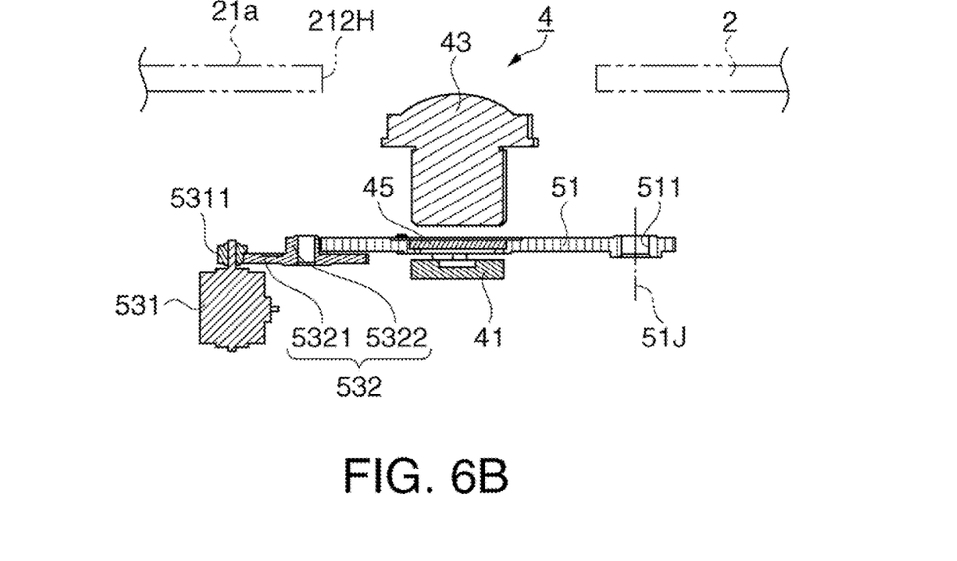

FIGS. 6A and 6B illustrate the image pickup device 4 in the second condition. FIG. 6A is a plan view, while FIG. 6B is a cross-sectional view. The circuit board 42, the base member 52, and the pressing member 54 are not shown in FIGS. 6A and 6B.

The movable member 51 which holds the optical filter 44 and the visible light transmitting member 45 is supported on the base member 52 in such a condition as to be rotatable relative to the base member 52. As illustrated in FIG. 6A, the movable member 51 has a shape radially expanded from one end thereof to the other end. A round hole (bearing 511) whose center is located on a center axis 51J is formed in the vicinity of the one end of the movable member 51. On the other hand, a gear 51G whose center is similarly located on the center axis 51J is formed at the other end of the movable member 51. As illustrated in FIG. 5, the center axis 51J extends in a direction along an optical axis 41J of the image pickup element 41.

The movable member 51 has two rectangular concaves between the bearing 511 and the gear 51G. The optical filter 44 and the visible light transmitting member 45 are bonded to these concaves and arranged adjacent to each other (see FIG. 5). An opening is formed in each bottom of the two concaves so that light transmitted through the corresponding component 44 or 45 in the first condition or the second condition can pass through the opening and reach the image pickup element 41.

More specifically, in the second condition, the visible light transmitting member 45 is inserted between the image pickup element 41 and the image pickup lens 43 as illustrated in FIG. 6B. Light released from the image pickup lens 43 and transmitted through the visible light transmitting member 45 passes through the opening of the concave to reach the image pickup element 41. Though not shown in the figure, the optical filter 44 is inserted between the image pickup element 41 and the image pickup lens 43 in the first condition. Light released from the image pickup lens 43 and transmitted through the optical filter 44 passes through the opening of the concave to reach the image pickup element 41.

As illustrated in FIG. 5, the base member 52 disposed between the circuit board 42 and the movable member 51 supports the movable member 51 such that the movable member 51 can rotate.

As can be seen from FIG. 5, the base member 52 having a rectangular shape in the plan view includes a support shaft 521 in the vicinity of one end of the base member 52, and a gear support shaft 522 in the vicinity of the other end.

The support shaft 521 is inserted into the bearing 511 of the movable member 51 to support the movable member 51 such that the movable member 51 can rotate. The gear support shaft 522 is inserted into a junction gear 532 (described later) to support the junction gear 532 such that the junction gear 532 can rotate.

The base member 52 has an opening 523 and a guide projection 524 between the support shaft 521 and the gear support shaft 522, and further has a round hole 525 in the vicinity of the gear support shaft 522.

The opening 523 is an opening through which the light transmitted through the optical filter 44 or the visible light transmitting member 45 passes. The guide projection 524 is a portion projecting in a circular-arc shape whose center is located on the center axis 51J, and formed between the opening 523 and the gear support shaft 522. The guide projection 524 contacts and guides the movable member 51 so that the movable member 51 can smoothly rotate along the guide projection 524. The round hole 525 is a hole into which a pinion 5311 of a stepping motor 531 (described later) is inserted.

As illustrated in FIG. 5, the driving unit 53 has the stepping motor 531 and the junction gear 532, and rotates the movable member 51 in accordance with instructions issued from the controller.

The stepping motor 531 has the pinion 5311 incorporated in a driving shaft of the stepping motor 531. The pinion 5311 is inserted into the round hole 525 from the side below the base member 52 as viewed in FIG. 5 for attachment between the stepping motor 531 and a lower surface of the base member 52.

The junction gear 532 transmits the driving force generated by the stepping motor 531 to the movable member 51. More specifically, the junction gear 532 made of synthetic resin has a large gear portion 5321 and a small gear portion 5322 coaxially stacked on each other as illustrated in FIGS. 5, 6A and 6B. The junction gear 532 is supported on the gear support shaft 522 of the base member 52 with engagements between the large gear portion 5321 and the pinion 5311 and between the small gear portion 5322 and the gear 51G of the movable member 51.

As illustrated in FIG. 5, the pressing member 54 is disposed on the side opposite to the base member 52 with respect to the movable member 51. The pressing member 54 having a rectangular shape in the plan view includes a cylindrical portion 541 at the center of the pressing member 54 to hold the image pickup lens 43 on the cylindrical portion 541. The pressing member 54 is fixed to the base member 52 by screws or the like such that the movable member 51 can be rotatably supported between the pressing member 54 and the base member 52.

Operation of Image Pickup Device

The operation of the image pickup device 4 is now explained.

Figure 7A:
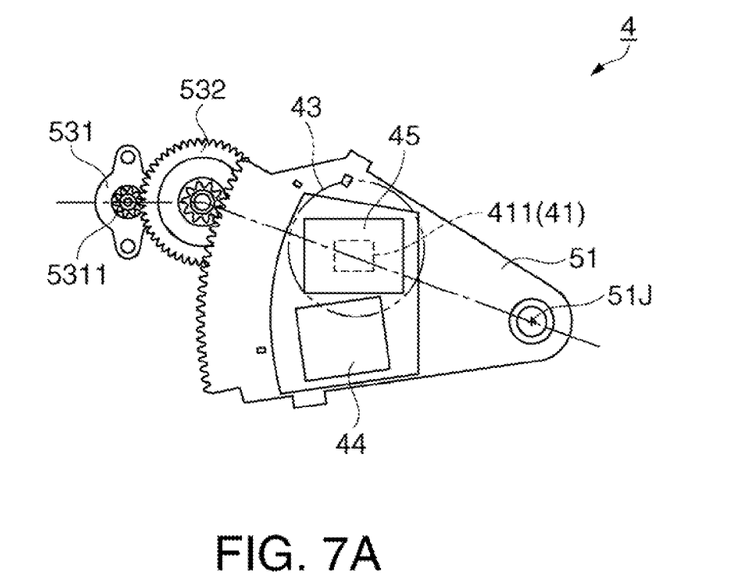
FIGS. 7A and 7B are plan views of the image pickup device according to the first embodiment.
Figure 7B:
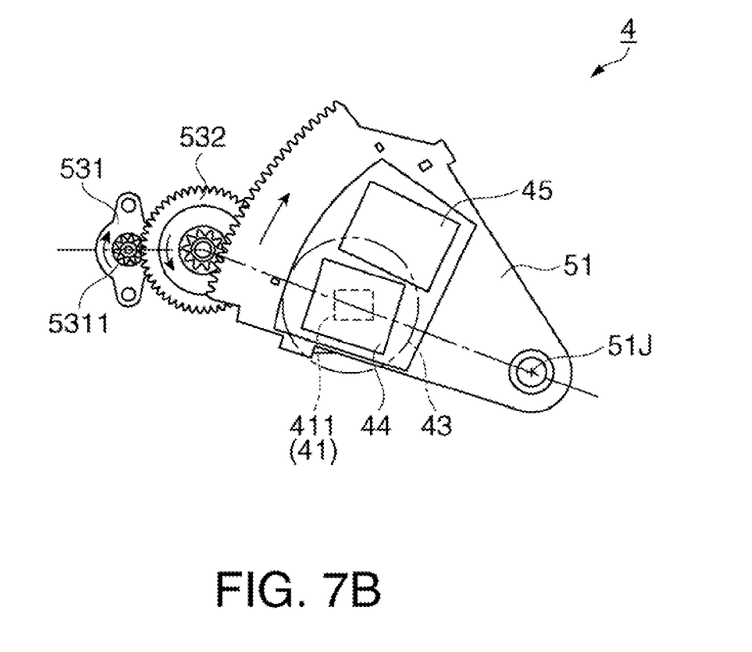

FIGS. 7A and 7B are plan views of the image pickup device 4. FIG. 7A corresponds to the second condition, while FIG. 7B corresponds to the first condition. The circuit board 42, the base member 52, and the pressing member 54 are not shown in FIGS. 7A and 7B.

The image pickup device 4 switches between the first condition and the second condition in accordance with rotation of the movable member 51 rotatable by operation of the stepping motor 531 in response to instructions from the controller. The image pickup device 4 captures an image of infrared light transmitted through the optical filter 44 in the first condition, and captures an image of visible light transmitted through the visible light transmitting member 45 in the second condition.

More specifically, as illustrated in FIG. 7A, the image pickup device 4 in the second condition captures an image projected on the projection surface SC (see FIG. 1) with the visible light transmitting member 45 positioned between the image pickup element 41 and the image pickup lens 43. Thus, the image pickup element 41 can capture an image of a control pattern or the like projected on the projection surface SC from the optical unit 3.

The display system 100 can make an adjustment based on the image captured by the image pickup element 41. For example, the display system 100 executes auto-calibration which automatically calibrates the pointing position of the pointing device 30 on the projection surface SC, automatic image distortion correction, and other controls based on the control pattern projected from the projector 1.

In response to the instruction for switch from the second condition to the first condition, the pinion 5311 of the image pickup device 4 starts clockwise rotation as viewed in FIG. 7B. With the clockwise rotation of the pinion 5311, the movable member 51 engaging with the pinion 5311 via the junction gear 532 similarly initiates clockwise rotation around the center axis 51J. When the movable member 51 reaches a predetermined position after rotation, the image pickup device 4 comes into the first condition where the optical filter 44 is positioned, between the image pickup element 41 and the image pickup lens 43 as illustrated in FIG. 7B.

In the first condition, the image pickup element 41 captures an image of infrared light emitted from the pointing device 30 when the pointing device 30 is operated on the projection surface SC.

The PC 20 analyzes the emission position of the infrared light based on the capture image obtained by the image pickup device 4, produces an overlapping image which contains a line corresponding to the track of the emission position and overlapping on image information, and transmits image information of the overlapping image to the projector 1. The projector 1 having received the overlapping image which contains the line corresponding to the track of the movement of the pointing device 30 projects the overlapping image onto the projection surface SC.

The display system 100 in this embodiment can also perform manual calibration in the first condition. More specifically, the display system 100 conducts manual calibration by capturing images of infrared light produced when an operator points mark images sequentially projected from the projector 1 by using the pointing device 30.

In response to the instruction for switch from the first condition to the second condition, the pinion 5311 and the movable member 51 of the image pickup device 4 rotate in the direction opposite to the direction of the switch from the second condition to the first condition. When the movable member 51 reaches a predetermined position after rotation, the image pickup device 4 comes into the second condition where the visible light transmitting member 45 is positioned between the image pickup element 41 and the image pickup lens 43 as illustrated in FIG. 7A.

Accordingly, the image pickup device 4 achieves switchover between the first condition and the second condition by rotation of the movable member 51 referable by operation of the driving unit 53 in response to the instruction from the controller before capturing an image of infrared light or an image of visible light, so that the projector 1 can project an image corresponding to the capture image received from the image pickup device 4.

Accordingly, the image pickup device 4 and the projector 1 in this embodiment can offer the following advantages.

(1) The image pickup device 4 has the optical filter 44 and the visible light transmitting member 45, and switches between the first condition in which the switching unit 5 positions the optical filter 44 on the optical path of light entering the image pickup element 41, and the second condition in which the switching unit 5 positions the visible light transmitting member 45 on this optical path. According to this structure, the image pickup element 41 receives infrared light transmitted through the optical filter 44 and captures an image of the infrared light in the first condition, and receives visible light transmitted through the visible light transmitting member 45 and captures an image of the visible light in the second condition.

Moreover, the structure which sets the optical filter 44 on the optical path of the light entering the image pickup element 41 in the first condition, and sets the visible light transmitting member 45 on this optical path in the second condition can reduce the difference between the first condition and the second condition in a refraction condition of the light reaching the image pickup element 41, thereby allowing the image pickup element 41 to capture an image while reducing the difference in a focal point between the first condition and the second condition.

Accordingly, the image pickup device 4 can securely capture both an image of infrared light and an image of visible light.

(2) The image pickup device 4 which has the image pickup lens 43 constituted by the wide angle lens captures an image of a broader area. Moreover, the optical filter 44 and the visible light transmitting member 45 disposed between the image pickup element 41 and the image pickup lens 43 can receive light approaching the image pickup element 41 to form an image thereon from the image pickup lens 43. According to this structure, the sizes of the optical filter 44 and the visible light transmitting member 45, and the shifts of these components 44 and 45 for switching between the first condition and the second condition become smaller and shorter than the corresponding sizes and shifts in such a structure which has the optical filter 44 and the visible light transmitting member 45 inside the image pickup lens 43 or outside the image pickup lens 43 (on the side opposite to the image pickup element 41 with respect to the image pickup lens 43). Thus, the image pickup device 4 can be miniaturized.

Moreover, the optical filter 44 and the visible light transmitting member 45 are disposed close to the image pickup element 41. In this case, the difference between the first condition and the second condition in the refraction condition of the light reaching the image pickup element 41 can further efficiently decrease.

Accordingly, the image pickup device 4 can securely capture images of infrared light and visible light while achieving size reduction, and thus can constitute the projector 1 without size increase.

(3) The optical filter 44 and the visible light transmitting member 45 supported on the movable member 51 are switched between the first condition and the second condition in accordance with rotation of the movable member 51 rotatable relative to the base member 52. Thus, switchover between the first condition and the second condition can be easily achieved by insertion and withdrawal of these components 44 and 45 to and from the space between the image pickup element 41 and the image pickup lens 43.

Moreover, the optical filter 44 and the visible light transmitting member 45 shift with higher accuracy than the corresponding accuracy in other examples such as an example which shifts these components 44 and 45 along lines. Thus, the structure in this embodiment can reduce the size and cost by efficiently sizing the optical filter 44 and the visible light transmitting member 45, and can easily detect the first condition or the second condition by using a detection switch added to detect the position of the movable member 51.

(4) The projector 1 in the second condition allows the image pickup device 4 to capture an image of a control pattern projected on the projection surface SC, and conducts auto-calibration, automatic image distortion correction, and other controls based on the captured image. On the other hand, the projector 1 in the first condition allows the image pickup device 4 to capture an image of infrared light emitted from the pointing device 30 when the pointing device 30 is operated on the projection surface SC, and projects an overlapping image containing the captured image onto the projection surface SC. In this case, the projector 1 can easily achieve interactive input and output while reducing complicated manipulation by the operator, thereby widening the range of applicability including applications for lessons, meetings and the like.

(5) The image pickup device 4 can capture an image projected on the projection surface SC such as a wall of a classroom or a meeting room, and a blackboard, other than the screen. Thus, the degree of freedom in applicability of the projector 1 increases.

Second Embodiment

The projector 1 according to a second embodiment is now described with reference to the drawings. In the following description, structures and parts similar to the corresponding structures and parts of the projector 1 in the first embodiment have been given similar reference numbers, and the detailed explanation of these structures and parts are not repeated or only briefly explained.

Figure 8A:
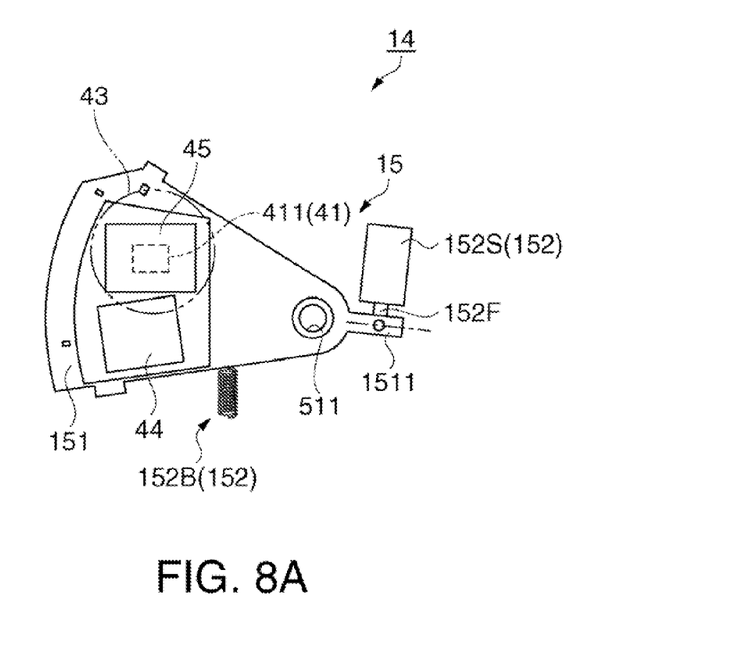
FIGS. 8A and 8B schematically illustrate a switching unit according to a second embodiment.
Figure 8B:
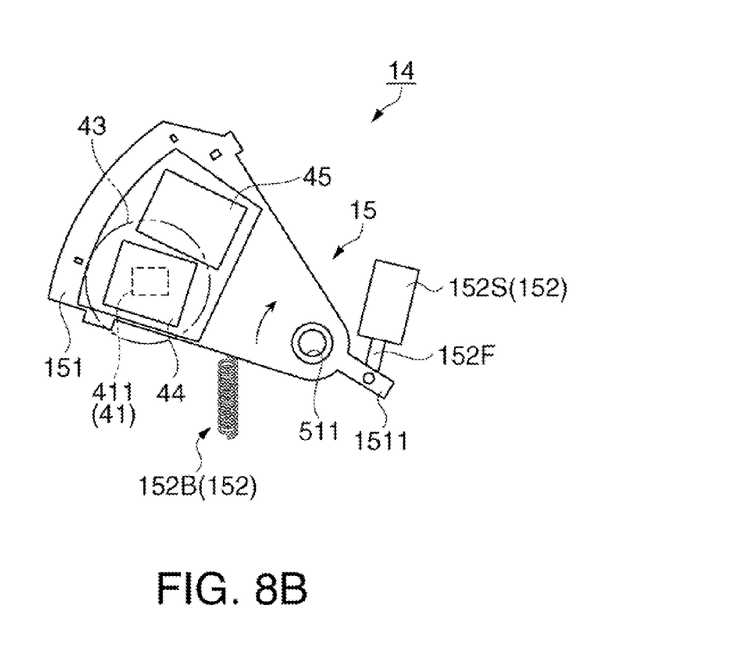

The projector 1 in this embodiment has an image pickup device 14 constructed differently from the image pickup device 4 in the first embodiment. The image pickup device 14 in this embodiment has a solenoid 152S in place of the stepping motor 531 in the first embodiment so as to switch between the first condition and the second condition by the actuation of the solenoid 152S.

FIGS. 8A and 8B schematically illustrate the image pickup device 14 in this embodiment. FIG. 8A corresponds to the second condition, while FIG. 8B corresponds to the first condition.

The image pickup device 14 includes the image pickup element 41, the circuit board 42 (not shown in FIGS. 8A and 8B), the image pickup lens 43, the optical filter 44, and the visible light transmitting member 45 all of which are similar to the corresponding components in the first embodiment, and a switching unit 15 constructed differently from the switching unit 5 in the first embodiment.

As illustrated in FIGS. 8A and 8B, the switching unit 15 has a movable member 151, a driving unit 152, and not-shown base member and pressing member.

The movable member 151 supports the optical filter 44 and the visible light transmitting member 45 similarly to the movable member 51 in the first embodiment, but does not have the gear 51G of the movable member 51. The movable member 151 has the bearing 511 similar to the bearing 511 of the movable member 51, and is designed to be rotatable. The movable member 151 further has a projection 1511 projecting from an end portion in the vicinity of the bearing 511 toward the side opposite to the optical filter 44 and the visible light transmitting member 45.

The driving unit 152 includes the solenoid 152S and a compression coil spring 152B.

The solenoid 152S has a coil (not shown), a fixed iron core (not shown), and a movable iron core 152F which linearly moves when receiving current. More specifically, when current is supplied to the coil, the movable iron core 152F is attracted toward the fixed iron core. However, when current is not supplied, the attracting force toward the fixed iron core does not act.

The solenoid 152S in this embodiment is constituted by a pull-type solenoid which decreases the projection length of the movable iron core 152F when receiving current. The attracting force of the solenoid is set larger than the urging force of the compression coil spring 152B. The solenoid 152S is disposed above the projection 1511 as viewed in FIGS. 8A and 8B, with the movable iron core 152F connected with the projection 1511.

The compression coil spring 152B is positioned on the side opposite to the solenoid 152S with respect to the bearing 511. One end of the compression coil spring 152B contacts the not-shown base member, and the other end contacts a lower surface of the movable member 151 as viewed in FIGS. 8A and 8B. The compression coil spring 152B urges the movable member 151 in the upward direction.

The not-shown base member and pressing member support the movable member 151 such that the movable member can rotate.

The movable member 151 of the switching unit 15 rotates by supply and cutoff of power to the solenoid 152S in accordance with the instruction from the controller so as to change the first condition or the second condition to the opposite condition.

More specifically, when current is supplied to the solenoid 152S, the movable iron core 152F shifts to decrease its projection length while resisting the urging force of the compression coil spring 152B. As a result, the projection 1511 of the movable member 151 is pulled by the movable iron core 152F, and brought into the second condition in which the visible light transmitting member 45 is inserted between the image pickup element 41 and the image pickup lens 43 as illustrated in FIG. 8A.

When supply of current to the solenoid 152S is stopped, the movable member 151 rotates clockwise as viewed in FIG. 8B by the urging force of the compression coil spring 152B. As a result, the optical filter 44 supported on the movable member 151 is brought into the first condition in which the optical filter 44 is inserted between the image pickup element 41 and the image pickup lens 43 as illustrated in FIG. 8B.

Accordingly, the image pickup device 14 and the projector 1 in this embodiment can offer the following advantages in addition to the advantages provided in the first embodiment.

(1) The movable member 151 can be easily rotated by the linear movement of the solenoid 152S. Thus, the image pickup device 14 can be switched between the first condition and the second condition by electric power using a simple structure. Moreover, elimination of the need for providing a permanent magnet on the solenoid 152S in this embodiment allows a compact and lightweight solenoid to be employed, contributing to reduction of the size and weight of the switching unit 15, and therefore reduction of the size and weight of the projector 1.

(2) The solenoid 152S is so designed as to receive current in the second condition which might be less frequent than the first condition. Thus, the power consumption of the projector 1 decreases.

The respective embodiments may be modified as in the following examples.

Modified Example 1

According to the first embodiment, the stepping motor 531 is used to rotate the movable member 51. However, the movable member 51 may be rotated by using a direct current motor or the like in place of the stepping motor 531.

Also, such a detection switch may be equipped which turns on or off the movable member 51 in accordance with the switchover between the first condition and the second condition.

Modified Example 2

According to the respective embodiments, the optical filter 44 and the visible light transmitting member 45 are positioned between the image pickup element 41 and the image pickup lens 43. However, these components 44 and 45 may be located at other positions as long as they can be positioned on the optical path of the light entering the image pickup element 41.

Figure 9A:
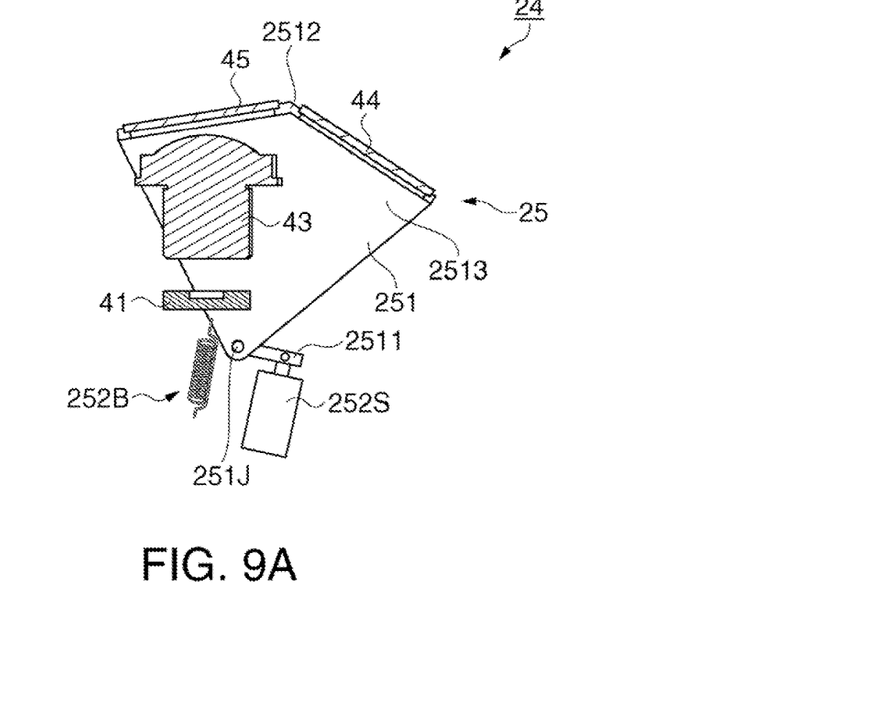
FIGS. 9A and 9B are cross-sectional views schematically showing an image pickup device according to a modified example 2.
Figure 9B:
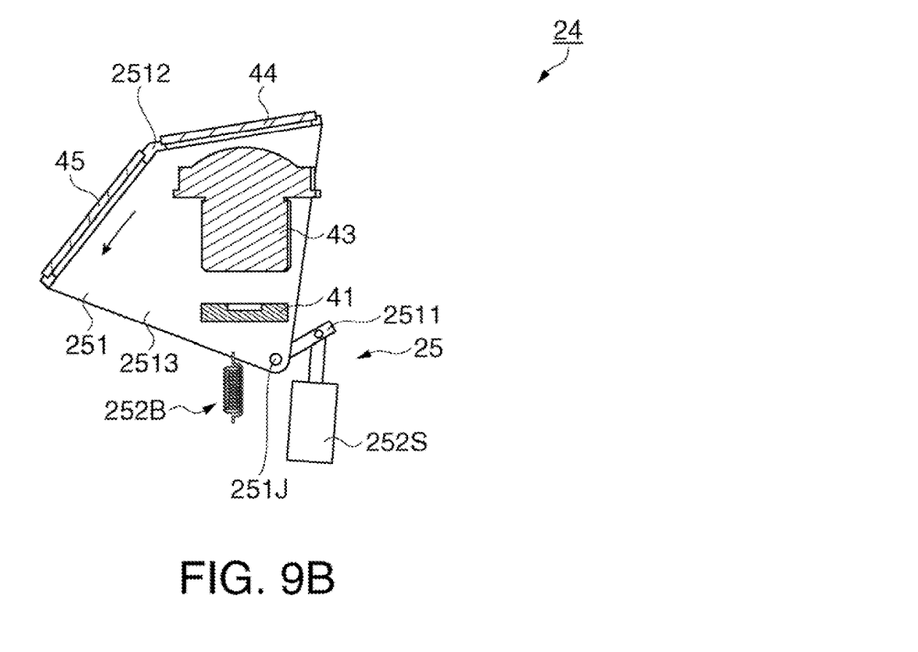

FIGS. 9A and 9B are cross-sectional views schematically showing an image pickup device 24 in a modified example 2. FIG. 9A corresponds to the second condition, while FIG. 9B corresponds to the first condition.

As illustrated in FIGS. 9A and 9B, the optical filter 44 and the visible light transmitting member 45 are supported side by side on a movable member 251 of a switching unit 25, and are shifted to reach the optical path outside the image pickup lens 43 (on the side opposite to the image pickup element 41 with respect to the image pickup lens 43).

As can be seen from FIGS. 9A and 9B, the movable member 251 has a frame 2512 supporting the optical filter 44 and the visible light transmitting member 45, and a side surface 2513 covering the sides of the image pickup element 41 and the image pickup lens 43. A rotation shaft 2515 is provided at the end of the side surface 2513. A projection 2511 projecting from the side surface 2513 is equipped in the vicinity of the rotation shaft 251J. The projection 2511 connects with a movable iron core of a solenoid 252S having a structure similar to the structure of the solenoid 152S in the second embodiment.

The movable member 251 is rotated by linear movement of the solenoid 252S and the urging force of a tension coil spring 252B disposed on the side opposite to the solenoid 252S with respect to the rotation shaft 251J so as to switch between the first condition and the second condition in accordance with the instruction from the controller.

More specifically, when current is supplied to the solenoid 252S, the movable iron core contracts while resisting the urging force of the tension coil spring 252B, and comes into the second condition in which the visible light transmitting member 45 is disposed in such a position as to cover a front surface of the image pickup lens 43, that is, disposed on the optical path of the light entering the image pickup element 41 as illustrated in FIG. 9A.

When current supply to the solenoid 252S is stopped, the movable member 251 rotates anticlockwise as viewed in FIG. 9B by the urging force of the tension coil spring 252B. As a result, the optical filter 44 supported, on the movable member 251 is shifted to cover the front surface of the image pickup lens 43 to come into the first condition as illustrated in FIG. 9B.

Alternatively, the movable member 251 may be rotated using a motor equipped in place of the solenoid 252S in the modified example 2.

Modified Example 3

The visible light transmitting member 45 in the modified example 2 may be eliminated to reduce the size of the movable member 251, in which case a condition where the optical filter 44 is positioned on the optical path of the light entering the image pickup element 41 (first condition), and a condition where the optical filter 44 is withdrawn from the optical path (withdrawal condition) are switched. In this case, the settings of the image pickup lens 43 can be determined such that the difference between the first condition and the withdrawal condition in the refraction condition of the light reaching the image pickup element 41 decreases. Thus, changeover of the position of the optical filter 44 can be achieved outside the image pickup lens 43 while securing capture of the images of the infrared light and the visible light without size increase.

Modified Example 4

According to the respective embodiments, the optical filter 44 and the visible light transmitting member 45 are constituted by glass plates having similar thicknesses. However, the optical filter 44 and the visible light transmitting member 45 may be made of different materials or nave different thicknesses so that each of the optical filter 44 and the visible light transmitting member 45 has an appropriate refractive index or a plate thickness for the transmission wavelength and thereby focuses the light on the image pickup element 41. In other words, the optical filter 44 and the visible light transmitting member 45 may be made of materials having different refractive indexes and plate thicknesses as long as the light can be focused on the image pickup element 41 in the first condition and the second condition.

Modified Example 5

According to the respective embodiments and modified examples, the switching units 5, 15, and 25 rotate the movable members 51, 151, and 251 by electric power. However, the movable members 51, 151, and 251 may be rotated by manual operation of an operation unit added and connected to the movable members 51, 151, and 251.

Modified Example 6

According to the respective embodiments, the projector 1 contains the transmission type liquid crystal light valves 351 as light modulation devices. However, the projector 1 may use reflection type liquid crystal light valves.

Modified Example 7

The light source 311 is not limited to the discharge-type lamp but may be other types of lamp or a solid light source such as a light emitting diode.

Modified Example 8

According to the embodiment and the modified example, the image pickup devices 14 and 24 are contained in the projector 1. However, the image pickup devices 14 and 24 may be equipped separately from the projector 1.

The entire disclosure of Japanese Patent Application No. 2011-173619, filed Aug. 9, 2011 is expressly incorporated by reference herein.

What is claimed is:

1. An image pickup device, comprising:
   an image pickup element which captures an image of a subject;
   an optical filter which has higher transmissivity in an infrared range than in a visible light range;
   a visible light transmitting member which has higher transmissivity in the visible light range than the transmissivity of the optical filter in the visible light range;
   a switching unit which switches between a first condition where the optical filter is disposed on an optical path of light entering the image pickup element, and a second condition where the visible light transmitting member is disposed on the optical path; and
   an image pickup lens which forms an image of light received from the subject on the image pickup element,
   wherein the optical filter is inserted between the image pickup element and the image pickup lens in the first condition, and the visible light transmitting member is inserted between the image pickup element and the image pickup lens in the second condition,
   wherein the switching unit includes a movable member which holds the optical filter and the visible light transmitting member, a pressing member between the movable member and the image pickup lens, the pressing member including a cylindrical portion at a center of the pressing member in order to hold the image pickup lens, and a base member which supports the movable member in such a condition that the movable member can rotate,
   wherein the movable member switches between the first condition and the second condition by rotation in a first direction to the first condition and rotation in a second opposite direction to the second condition around a center shaft at one end of the movable member that extends in a direction along an optical axis of the image pickup element,
   wherein the movable member has a shape that radially expands from the one end to another end with an arc formed at the another end, and
   wherein the pressing member is fixed to the base member such that the movable member can be rotatably supported between the pressing member and the base member.

2. A projector, comprising:
   a projection unit which modulates light emitted from a light source according to image information and projects the modulated light; and
   the image pickup device according to claim 1 which captures an image of a projection surface onto which light emitted from the projection unit is projected.

* * * * *